United States Patent
Molina et al.

(10) Patent No.: US 11,044,398 B2
(45) Date of Patent: Jun. 22, 2021

(54) PANORAMIC LIGHT FIELD CAPTURE, PROCESSING, AND DISPLAY

(71) Applicant: Apple Inc., Cupertino, CA (US)

(72) Inventors: Gabriel D. Molina, San Jose, CA (US); Ricardo J. Motta, Palo Alto, CA (US); Gary L. Vondran, Jr., San Carlos, CA (US); Dan Lelescu, Morgan Hill, CA (US); Tobias Rick, Mountain View, CA (US); Brett Miller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/583,176

(22) Filed: Sep. 25, 2019

(65) Prior Publication Data
US 2020/0106959 A1     Apr. 2, 2020

Related U.S. Application Data

(60) Provisional application No. 62/739,097, filed on Sep. 28, 2018.

(51) Int. Cl.
| | |
|---|---|
| *H04N 5/232* | (2006.01) |
| *H04N 13/106* | (2018.01) |
| *G06T 7/557* | (2017.01) |
| *H04N 13/282* | (2018.01) |
| *H04N 13/117* | (2018.01) |

(Continued)

(52) U.S. Cl.
CPC ......... *H04N 5/23238* (2013.01); *G06T 7/557* (2017.01); *H04N 13/106* (2018.05); *G06T 2200/21* (2013.01); *G06T 2207/10052* (2013.01)

(58) Field of Classification Search
CPC .. H04N 5/23238; H04N 13/106; G06T 7/557; G06T 2207/10052
See application file for complete search history.

(56) References Cited

U.S. PATENT DOCUMENTS

| | | |
|---|---|---|
| 9,024,947 B2 | 5/2015 | Coombe et al. |
| 9,936,131 B2 | 4/2018 | Putraya et al. |

(Continued)

OTHER PUBLICATIONS

Daniel Donatsh et al, "Hand-Held 3D light Field photography and Applications", May 2014, vol. 30m No. 6-8, pp. 897-907.*

(Continued)

*Primary Examiner* — Christopher K Peterson
(74) *Attorney, Agent, or Firm* — Robert C. Kowert; Kowert, Hood, Munyon, Rankin & Goetzel, P.C.

(57) ABSTRACT

A light field panorama system in which a user holding a mobile device performs a gesture to capture images of a scene from different positions. Additional information, for example position and orientation information, may also be captured. The images and information may be processed to determine metadata including the relative positions of the images and depth information for the images. The images and metadata may be stored as a light field panorama. The light field panorama may be processed by a rendering engine to render different 3D views of the scene to allow a viewer to explore the scene from different positions and angles with six degrees of freedom. Using a rendering and viewing system such as a mobile device or head-mounted display, the viewer may see behind or over objects in the scene, zoom in or out on the scene, or view different parts of the scene.

25 Claims, 9 Drawing Sheets

(51) Int. Cl.
    *G06T 5/50*           (2006.01)
    *G06T 7/00*           (2017.01)
    *G06T 1/00*           (2006.01)

(56) References Cited

U.S. PATENT DOCUMENTS

| | | |
|---|---|---|
| 2012/0019614 A1 | 1/2012 | Murray et al. |
| 2013/0077880 A1* | 3/2013 | Venkataraman ..... H04N 19/136 |
| | | 382/232 |
| 2017/0180705 A1 | 6/2017 | Erickson |
| 2019/0230280 A1* | 7/2019 | Kikukawa ............ H04N 13/111 |

OTHER PUBLICATIONS

International Search report and Written Opinion from PCT/US2019/053635, (Apple Inc.), dated Dec. 6, 2019, pp. 1-13.
Daniel Donatsh et al, "Hand-Held 3D light Field photography and Applications", vol. 30m No. 6-8, dated May 15, 2014, pp. 897-907.
Niemann H et al, "Evaluating the quality of light fields computed from hand-held camera images", vol. 26, No. 3, Dated Feb. 2005, pp. 239-249.
Han Xu et al, "Indoor Localization via multi-modal sensing on smartphones", dated Sep. 12, 2016, pp. 208-219.
Eric Marchand et al, "Pose Estimation for Augmented Reality: A Hands-on Survey", dated Dec. 2016, pp. 2633-2651.
Yenting Lin et al, Oclusion-aware layered scene recovery from light fields, dated Sep. 15, 2013, pp. 295-299.
Heung-Yeung Shum et al, "Pop-up Light Field", dated Apr. 2004, pp. 143-162.
Abe Davis et al, "Unstructured Light Fields", vol. 31, No. 2, dated May 2012m, pp. 305-314.

* cited by examiner

PANORAMIC LIGHT FIELD CAPTURE, PROCESSING, AND DISPLAY

PRIORITY INFORMATION

This application claims benefit of priority of U.S. Provisional Application Ser. No. 62/739,097 entitled "PANORAMIC LIGHT FIELD CAPTURE, PROCESSING, AND DISPLAY" filed Sep. 28, 2018, the content of which is incorporated by reference herein in its entirety.

BACKGROUND

Small, mobile multipurpose devices such as smartphones and tablet or pad devices include one or more cameras that are capable of capturing high resolution, high quality digital images. Camera applications executing on these devices allow a user to capture single images of a scene through the device's camera(s). Some camera applications may also allow the user to capture video sequences of a scene. Some camera applications may also allow the user to capture panoramic images by panning the camera (e.g., from left to right) to capture a sequence of images of a scene; the images are then processed to stitch the images together to form an image with a wider field of view of the scene than can be captured in a single image.

In light field photography, a light field camera captures color intensities of light in a scene, and also the direction that the light rays are traveling in space. This contrasts with a conventional camera, which records only light color intensities. One type of light field camera uses an array of micro-lenses placed in front of an image sensor. Multi-camera arrays are another type of light field camera.

Virtual reality (VR) allows users to experience and/or interact with an immersive artificial environment, such that the user feels as if they were physically in that environment. For example, virtual reality systems such as head-mounted displays (HMDs) may display stereoscopic scenes to users in order to create an illusion of depth, and a computer may adjust the scene content in real-time to provide the illusion of the user moving within the scene. When the user views images through a virtual reality system, the user may thus feel as if they are moving within a scene from a first-person point of view. Virtual reality systems may be utilized to provide an interactive user experience for multiple applications.

SUMMARY

Various embodiments of methods and apparatus for capturing, processing, and rendering light field panoramas are described. In embodiments of a light field panorama system, a user holding a mobile device that includes a camera, such as a smartphone, tablet, or pad device, performs a gesture to move the camera in front of a scene of interest to capture a set of digital images of the scene from different positions. Additional information, for example position and orientation information from motion and position sensing technology of the device, may also be captured with the images. The captured images and information may be processed to determine metadata including the relative camera positions of the images with respect to the scene and depth and geometry information for content of the scene captured in the images. The images and metadata may be collectively referred to as a light field panorama.

The captured scene represented by the light field panorama may be explored by a viewer using a rendering and viewing system on an HMD, a mobile device such as a smartphone, tablet, or pad device, or on a computer system. The light field panorama data (images and metadata) for the scene may be processed by a rendering engine to render different 3D views of the scene to allow the viewer to explore the scene from different positions and angles with six degrees of freedom. Using the rendering and viewing system, the viewer may change their viewing position and angle to see behind or over objects in the scene, zoom in or out on the scene, or view different parts of the scene.

Thus, the light field panorama allows a viewer to explore a scene with six degrees of freedom (6DOF), meaning the viewer can rotate with the content as well as translate in different directions. By contrast, a typical 360 panorama (or photo sphere) only allows three degrees of freedom in the rendering, meaning that the viewer can only rotate their head but cannot translate through the content as they can when exploring the light field panorama.

Embodiments may, for example, allow the viewer to experience the captured wide angle content of a scene in immersive virtual reality, for example via an HMD. The image that is captured is 'parallax' aware in that when the image is rendered in virtual reality, objects in the scene will move properly according to their position in the world and the viewer's relative position to them. In addition, the image content appears photographically realistic compared to renderings of computer generated content that are typically viewed in virtual reality systems.

Figure 1:
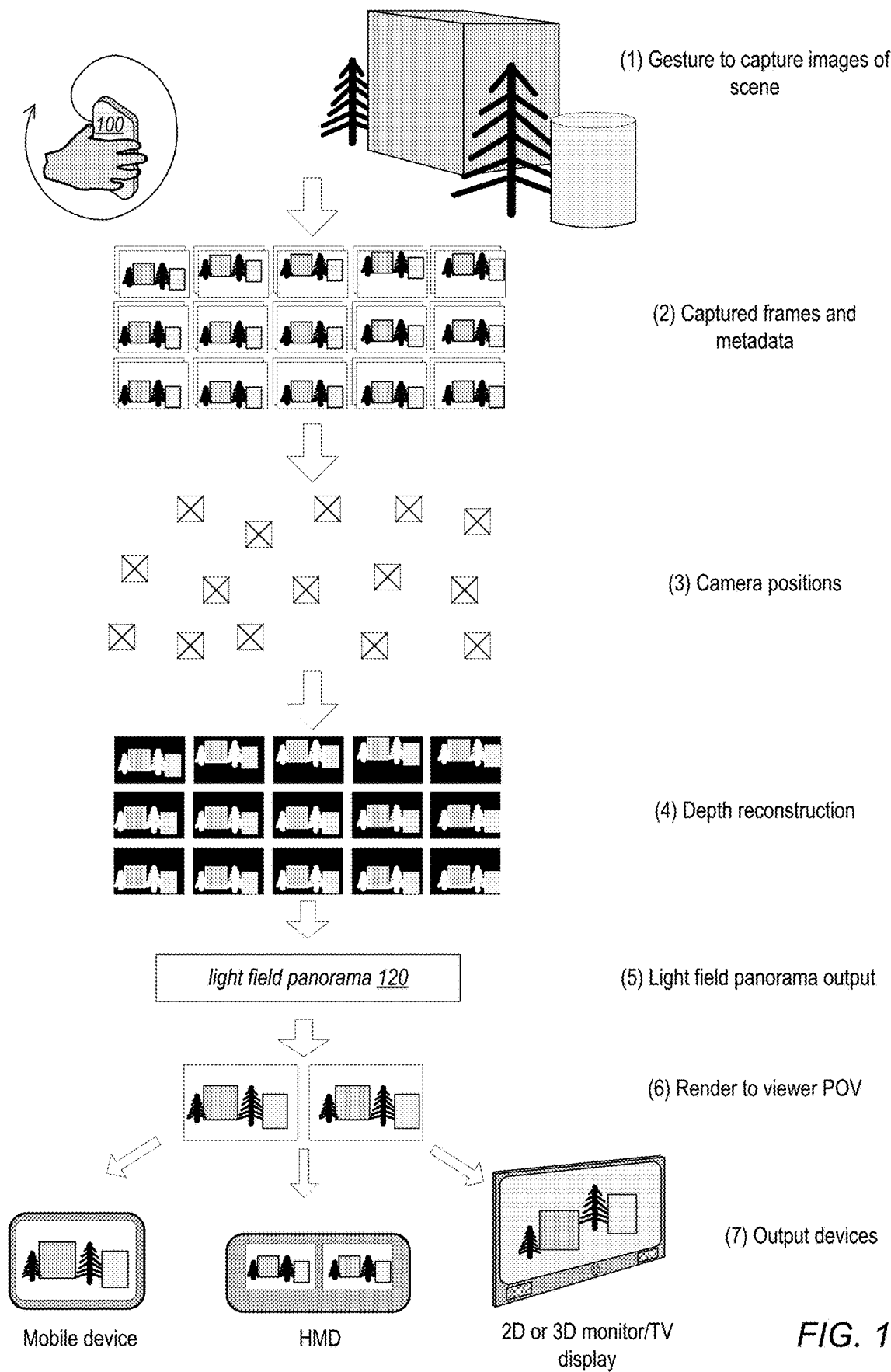
FIG. 1 graphically illustrates a high-level flow of operations of a light field panorama system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for capturing, processing, and rendering light field panoramas are described. In embodiments of a light field panorama system, a user holding a mobile device that includes a camera, such as a smartphone, tablet, or pad device, performs a gesture to move the camera in front of a scene of interest to capture a set of digital images of the scene from different positions. Additional information, for example white balance and exposure settings of the camera and position and orientation information from motion and position sensing technology of the device, may also be captured with the images. The captured images and information may be processed to determine metadata including the relative camera positions of the images with respect to the scene and depth and geometry information for content of the scene captured in the images. The camera position for an image indicates the position of the camera with respect to the scene when the image was captured. The images and metadata may be collectively referred to as a light field panorama. Note that a single panoramic or light-field image is not generated and stored; instead, the image data and associated metadata including but not limited to depth information for the image data are stored as a three-dimensional light field panorama from which views of a scene captured in the light field panorama can be rendered from different positions and angles based on a viewer's current position and orientation. In some embodiments, the light field panorama data may include layers, including a primary layer and one or more occlusion layers, with each layer including one or more frames, with each frame including image data composed of pixel data for the frame and depth data for the frame, as well as addition metadata for the frame (e.g., 3D position/orientation information for the frame with respect to the scene and other frames).

The captured scene represented by the light field panorama data may be explored by a viewer using a rendering and viewing system on an HMD, a mobile device such as a smartphone, tablet, or pad device, on a television, monitor, or display wall, or on a computer system. The light field panorama data (images and metadata) for the scene may be processed by a rendering engine to render different 3D views of the scene to allow the viewer to explore the scene from different positions and angles with six degrees of freedom. For example, using an HMD, the viewer may move to the left or right, move up or down, rotate their head left or right, or tilt their head up or down to view the scene from different positions and angles. Using a mobile device, the viewer may move the device to the left or right, move the device up or down, rotate the device left or right, or tilt the device up or down to view the scene from different positions and angles. Alternatively, touch gestures may be used to explore the scene on a mobile device. Using a computer system such as a laptop or notebook computer, the user may use a cursor control device, touch screen, or keyboard to explore the scene from different positions and angles. Using the rendering and viewing system, the viewer may change their viewing position and angle to see behind or over objects in the scene, zoom in or out on the scene, or view different parts of the scene.

Thus, the light field panorama allows a viewer to explore a scene with six degrees of freedom (6DOF), meaning the viewer can rotate with the content as well as translate in different directions. By contrast, a typical 360 panorama (or photo sphere) only allows three degrees of freedom in the rendering, meaning that the viewer can only rotate their head but cannot translate through the content as they can when exploring the light field panorama.

Embodiments may, for example, allow the viewer to experience the captured wide angle content of a scene in immersive virtual reality, for example via an HMD. The image that is captured is 'parallax' aware in that when the image is rendered in virtual reality, objects in the scene will move properly according to their position in the world and the viewer's relative position to them. In addition, the image content appears photographically realistic compared to renderings of computer generated content that are typically viewed in virtual reality systems.

FIG. 1 graphically illustrates a high-level flow of operations of a light field panorama system, according to some embodiments. At (1), a user captures images of a scene using a gesture to move a mobile device 100 including one or more cameras to different positions. The images may be still images or frames, or alternatively may be video frames. Additional information, for example white balance and exposure settings of the camera, camera position and orientation information from motion and position sensing technology of the device 100, and/or depth information captured by depth sensing technology of the device 100, may also be captured with the images. At (2), the captured frames and metadata may be analyzed to select a set of keyframes based on one or more criteria (e.g., scene features). In some embodiments, a real-time engine executing on mobile device 100 and/or as a network-based service may generate and display a live preview of the captured scene to the user interface of the device 100.

At (3), camera positions and orientations for the keyframes may be computed. In some embodiments, a structure from motion (SfM) algorithm may be used in which scene feature points are identified in the keyframes, the feature points are matched across the keyframes, identified feature points are correlated, and the relative disparity between the feature points in different keyframes are used to compute the camera positions and orientations for the keyframes. In some embodiments, motion and position data collected from motion/position sensor(s) of the device 100 may be used to augment or assist the SfM algorithm, or instead of the SfM algorithm, to determine the camera positions and orientations for the frames.

At (4), a pixel depth map may be computed for each camera position/keyframe. In some embodiments, the depth is computed by finding the pixel disparity between the keyframes combined with knowledge of the distance between the keyframes.

At (5), output of the processing pipeline is a 3D representation of the scene (e.g., a data file or a set of files) based on the processed image data, referred to as a light field panorama 120, that may be later loaded or streamed to a rendering engine of a viewing device (e.g., a mobile device, HMD, or computer device). Note that a single panoramic or light-field image is not generated and stored; instead, the image data and associated metadata including but not limited to depth information for the image data are stored as a three-dimensional light field panorama 120 from which views of a scene captured in the light field panorama can be rendered from different positions and angles based on a viewer's current position and orientation. In some embodiments, the light field panorama 120 may include layers, including a primary layer and one or more occlusion layers, with each layer including one or more frames, with each frame including image data composed of pixel data for the frame and depth data for the frame, as well as addition metadata for the frame (e.g., 3D position/orientation information for the frame with respect to the scene and other frames).

Steps (2), (3), (4), and (5) may be performed by a processing pipeline implemented on the mobile device, on a computer device, or as a network-based service. Further, in some embodiments, the processing pipeline operations may be distributed between the mobile device and a network-based service, between the mobile device and a computer device, or otherwise distributed.

At (6), views of the scene represented by the light field panorama 120 may be rendered according to a viewer's perspective by a rendering engine. Given the depth information, camera positions, and images of the light field panorama 120, and information indicating current positions of the viewer with respect to the scene, the rendering engine can render views of the scene from various viewer perspectives or viewpoints. The rendering engine may be implemented by one or more processors, for example as a component of an image viewing system on a mobile device, an HMD or a base station coupled to an HMD by a wired or wireless connection, or a computer system or console connected to a monitor or television. The rendering engine may perform dynamic rendering of the light field panorama 120 data generated for a captured scene based on the viewer's current position and orientation to allow the viewer to explore content of the scene with six degrees of freedom. For example, using an HMD, the viewer may move to the left or right, move up or down, rotate their head left or right, or tilt their head up or down to view the scene from different positions and angles. Using a mobile device, the viewer may move the device to the left or right, move the device up or down, rotate the device left or right, or tilt the device up or down to view the scene from different positions and angles. Alternatively, touch gestures may be used to explore the scene on a mobile device. Using a computer system such as a laptop or notebook computer, the user may use a cursor control device, touch screen, or keyboard to explore the scene from different positions and angles. Using the rendering and viewing system, the viewer may change their viewing position and angle to see behind or over objects in the scene, zoom in or out on the scene, or view different parts of the scene. Note that, for viewing on an HMD, the rendering engine may generate two stereoscopic images for display on two display screens of the HMD.

Figure 2:
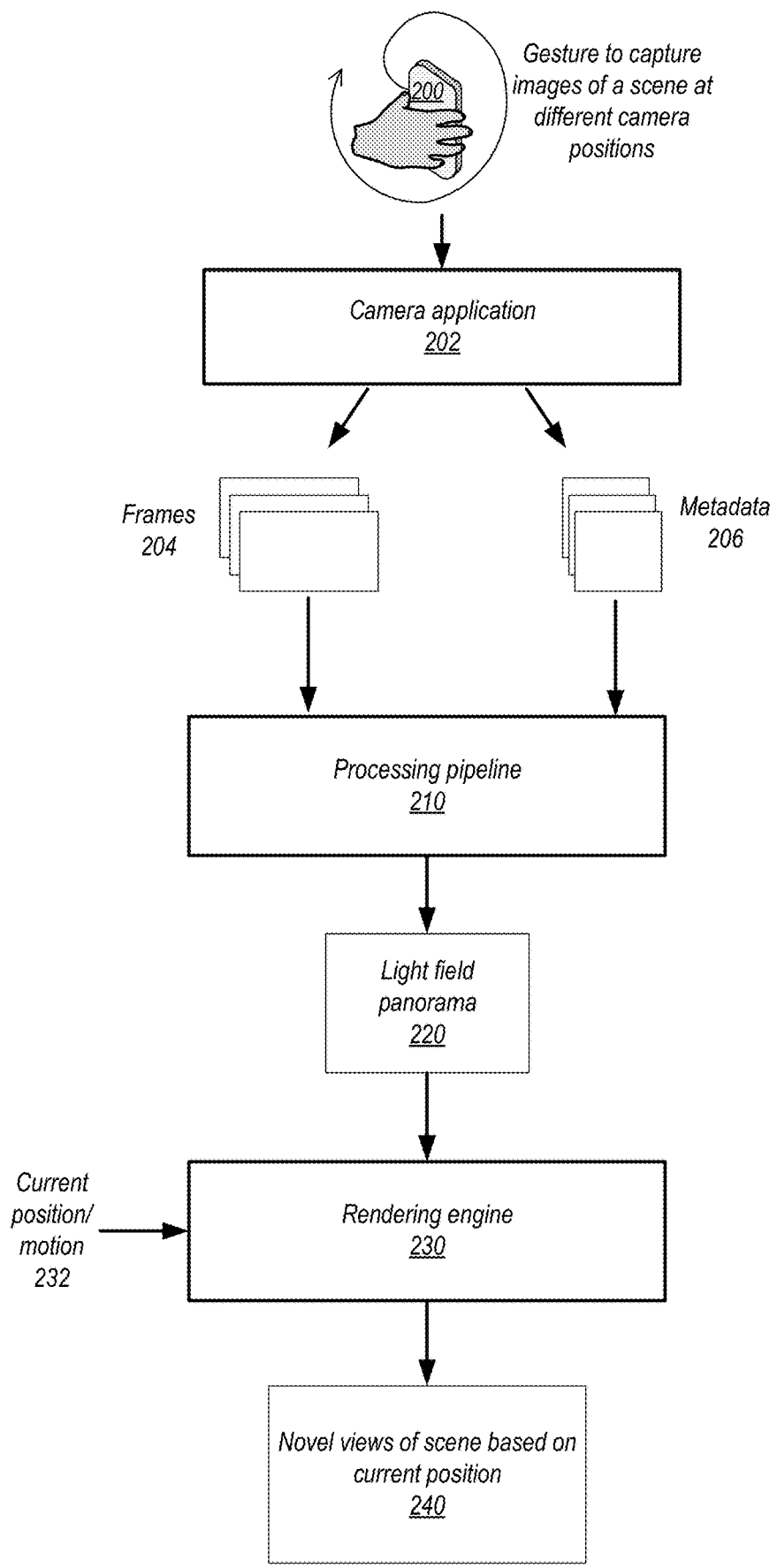
FIG. 2 graphically illustrates components of a light field panorama system, according to some embodiments.

FIG. 2 graphically illustrates components of a light field panorama system, according to some embodiments. Embodiments may include various methods and apparatus for capturing, processing, and rendering 6DOF light field panoramas from multiple images captured by a camera or cameras of a handheld mobile device 200 such as a smartphone, pad, or tablet device. In embodiments, a user uses a gesture to wave device 200 including an active camera or camera(s) in front of a scene of interest.

Embodiments may include a camera application 202 executing on one or more processors of the device 200 that captures multiple images or video frames (frames 204) automatically as the user moves the device 200 in front of the scene of interest. In some embodiments, the camera application 202 may present a user interface that guides the user as to where to place or move the device 200 to ensure sufficient data (e.g., a sufficient number of frames to cover the scene) is gathered for subsequent or concurrent processing and rendering. Additional information, for example white balance and exposure settings of the camera and camera position and orientation information from motion and position sensing technology of the device 200, may also be captured as metadata 206 for the frames 204. In some embodiments, the camera application 200 and/or other processes executing on the device 200 may perform initial processing of the frames 204 in real-time (as the images are being captured) to determine or estimate additional information for the frames 204. The additional information may include one or more of, but not limited to, optical flow information, real-time depth estimation, motion detection information, etc., and may be included in metadata 206. The camera application 202 may output frames 204 and metadata 206 to a processing pipeline 210.

Embodiments may also include a processing pipeline 210 implemented by one or more processors. The processing pipeline receives a set of frames 204 of a scene captured from multiple viewpoints and metadata 206 for the frames 204 from the camera application 202 on the mobile device 200. The metadata 206 may include one or more of, but is not limited to, the following:

Visual-inertial camera tracking information regarding estimated positions of the frames 206 when captured and/or geometric scale of the scene.

Additional metadata regarding image capture parameters such as white balance, exposure settings, etc.

Additional data from real-time processing including one or more of, but not limited to, optical flow, real-time depth estimation, motion detection, etc.

Depth data from a depth sensor or sensors of the device 200 active at the time of capture.

In some embodiments, the processing pipeline 210 performs the following using the frames 204 and metadata 206:

Globally estimates the positions and orientations (referred to as poses) of the frames 204 provided by the camera application 202. In some embodiments, a structure from motion (SfM) algorithm may be used in which scene feature points are identified in the frames 204, the feature points are matched across the frames 204, identified feature points are correlated, and the relative disparity between the feature points in different frames 204 are used to compute the camera poses for the frames 204. In some embodiments, motion and position data collected from motion/position sensor(s) of the device 200 may be used to augment or assist the SfM algorithm, or instead of the SfM algorithm, to determine the camera positions for the frames 204.

Selects a set of keyframes from the set of frames 204 based on one or more criteria. In some instances, all of the frames in the set of frames 204 may be selected as keyframes.

Uses the frames 204 and/or metadata 206 to calculate depth from the viewpoint of the keyframes. In some embodiments, the depth is computed by determining the pixel disparity between the keyframes, determining the distance between the keyframes, and determining depth based on the pixel disparity and distance between the keyframes.

Uses the depth estimated for multiple keyframes to compute a de-noised depth estimate for each keyframe.

Applies post-processing to reduce outliers in estimated depth maps for the keyframes.

The processing pipeline 210 then creates a 3D representation of the scene (e.g., a data file or a set of files) based on the processed frames 204 and metadata 206 that may be stored (e.g., on device 200, on a separate computer device, or in network/cloud-based storage) as a light field panorama 220. The light field panorama 220 may be loaded or streamed to a rendering engine 230 of a viewing device (e.g., a mobile device, HMD, or computer device). Note that a single panoramic or light-field image is not generated and stored; instead, the image data and associated metadata including but not limited to depth information for the image data are stored as a three-dimensional light field panorama 220 from which views of a scene captured in the light field panorama can be rendered from different positions and angles based on a viewer's current position and orientation. In some embodiments, the light field panorama 220 may include layers, including a primary layer and one or more occlusion layers, with each layer including one or more frames, with each frame including image data composed of pixel data for the frame and depth data for the frame, as well as addition metadata for the frame (e.g., 3D position/orientation information for the frame with respect to the scene and other frames).

In various embodiments, the processing pipeline 210 may operate at image capture time, in real-time, and/or offline. In other words, it is not required that the entire processing pipeline 210 operate on the captured image data in real-time on the mobile device 200 used to capture the images. In various embodiments, the processing pipeline 210 may be implemented on the mobile device 200, on one or more computer devices, or as a network-based service. Further, in some embodiments, the processing pipeline 210 operations may be distributed between the mobile device 200 and a network-based service, between the mobile device 200 and one or more computer devices, or otherwise distributed.

Embodiments may also include a rendering engine 230 implemented by one or more processors, for example as a component of an image viewing system on a mobile device, an HMD or a base station coupled to an HMD by a wired or wireless connection, or a computer system or console connected to a monitor or television. The rendering engine 230 may perform dynamic rendering of the light field panorama data generated for a captured scene based on a viewer's current position and/or motion 232 to allow the viewer to explore content of the scene with six degrees of freedom. In some embodiments, viewing a scene captured in a light field panorama 220 may start at a default or base position with respect to the scene. As the viewer changes position, position and motion 232 information may be estimated from motion and position sensing technology of the viewing device, the rendering engine 230 may determine the viewer's current perspective of the scene from the position and motion 232 information and the 3D geometrical information about the scene captured in the light field panorama 220, and the rendering engine 230 may render novel views of the scene captured in the light field panorama 220 based on the viewer's current perspective as determined from the position and motion 232 information. For example, using an HMD, the viewer may move to the left or right, move up or down, rotate their head left or right, or tilt their head up or down to view the scene from different positions and angles. Using a mobile device, the viewer may move the device to the left or right, move the device up or down, rotate the device left or right, or tilt the device up or down to view the scene from different positions and angles. Alternatively, touch gestures may be used to explore the scene on a mobile device. Using a computer system such as a laptop or notebook computer, the user may use a cursor control device, touch screen, or keyboard to explore the scene from different perspectives. Using the rendering and viewing system, the viewer may change their perspective to see behind or over objects in the scene, zoom in or out on the scene, or view different parts of the scene. Note that, for viewing on an HMD, the rendering engine may generate two stereoscopic images for display on two display screens of the HMD.

Figure 3:
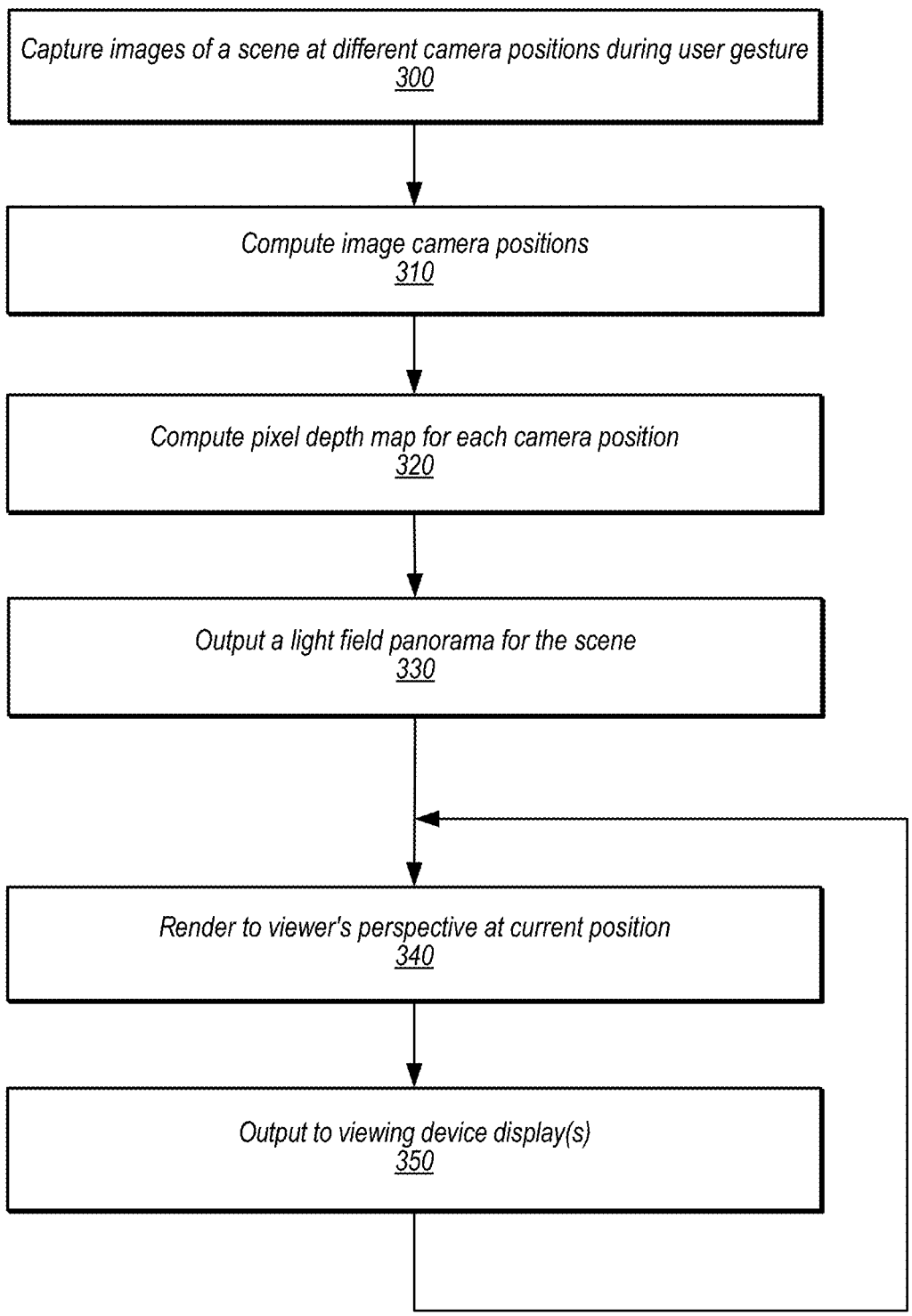
FIG. 3 is a high-level flowchart of a method of operation for a light field panorama system, according to some embodiments.

FIG. 3 is a high-level flowchart of a method of operation for a light field panorama system, according to some embodiments. As indicated at 300, multiple images of a scene are captured from different perspectives by one or more cameras and a camera application of a mobile device during a user gesture. A user captures images of a scene using a gesture to move a mobile device including one or more cameras to different positions. The images may be still images or frames, or alternatively may be video frames. Additional information, for example white balance and exposure settings of the camera, position and orientation information from motion and position sensing technology of the device, and/or depth information captured by depth sensing technology of the device, may also be captured with the images. In some embodiments, the captured frames may be analyzed to select a set of keyframes according to one or more criteria.

Elements 310 and 320 may be performed by a processing pipeline 210 as illustrated in FIG. 2. As indicated at 310, image camera positions are computed. In some embodiments, a structure from motion (SfM) algorithm may be used in which scene feature points are identified in a set of frames, the feature points are matched across the frames, identified feature points are correlated, and the relative disparity between the feature points in different frames are used to compute the camera positions for the frames. In some embodiments, motion and position data collected from motion/position sensor(s) of the capture device may be used to augment or assist the SfM algorithm, or instead of the SfM algorithm, to determine the camera positions for the frames.

As indicated at 320, a pixel depth map is computed for each camera position. In some embodiments, the depth is computed by finding the pixel disparity between the frames combined with knowledge of the distance between the frames. In some embodiments, the depth estimated for multiple frames may be used to compute a de-noised depth estimate for each frame.

As indicated at 330, a light field panorama is output. The light field panorama may include, but is not limited to, the images and metadata including the relative camera positions of the images with respect to the scene, depth information for the images, and geometry information for content of the scene captured in the images. Note that a single panoramic or light-field image is not generated as output; instead, the image data and associated metadata including but not limited to depth information for the image data are output as the light field panorama. In some embodiments, the light field panorama data may include layers, including a primary layer and one or more occlusion layers, with each layer including one or more frames, with each frame including image data composed of pixel data for the frame and depth information for the frame, as well as addition metadata for the frame (e.g., 3D position/orientation information for the frame with respect to the scene and other frames).

Elements 340 and 350 may be performed by a rendering engine 230 as illustrated in FIG. 2. As indicated at 340, a view of the scene is rendered for the viewer's current perspective based on a current position of the viewing device. As indicated at 350, the rendered view is output to display(s) of the viewing device. As indicated by the arrow returning from element 350 to 340, as the viewer moves the viewing device (e.g., by moving a mobile device held in their hand or by moving their head when wearing an HMD), new views of the scene are rendered and displayed based on their movements so that the viewer can explore the scene from different perspectives with six degrees of freedom.

Figure 4A:
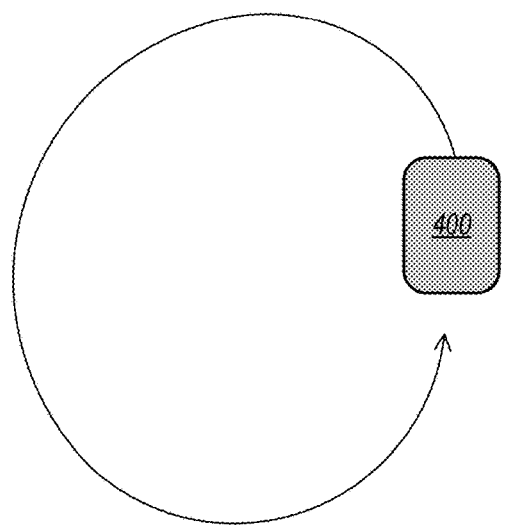
FIGS. 4A through 4F illustrate non-limiting, example gestures that may be used to capture frames for generating a light field panorama, according to some embodiments.
Figure 4B:
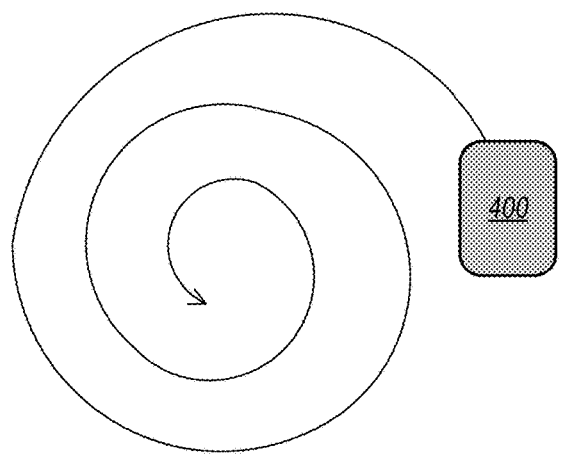
Figure 4C:
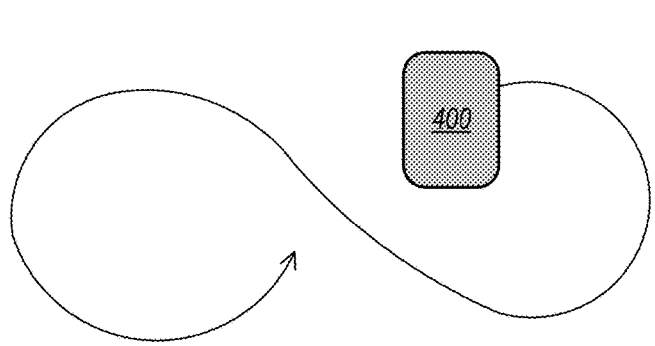
Figure 4D:
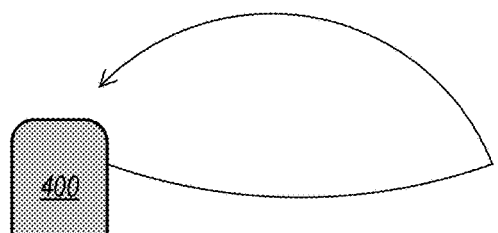
Figure 4E:
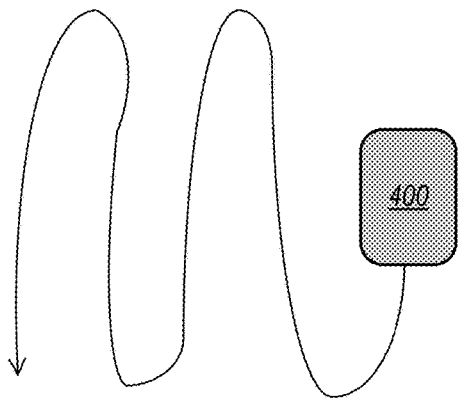
Figure 4F:
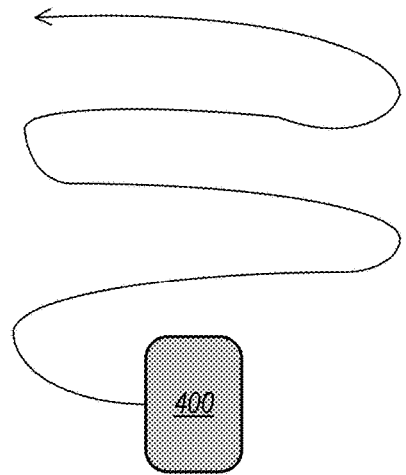

FIGS. 4A through 4F illustrate non-limiting, example gestures that may be used to capture frames for generating a light field panorama, according to some embodiments. FIG. 4A shows a circular gesture. FIG. 4B shows a spiral gesture. FIG. 4C shows a "figure eight" gesture. FIG. 4D shows a closed arc gesture. FIG. 4E shows a vertical zig-zag gesture. FIG. 4F shows a horizontal zig-zag gesture.

Figure 5A:
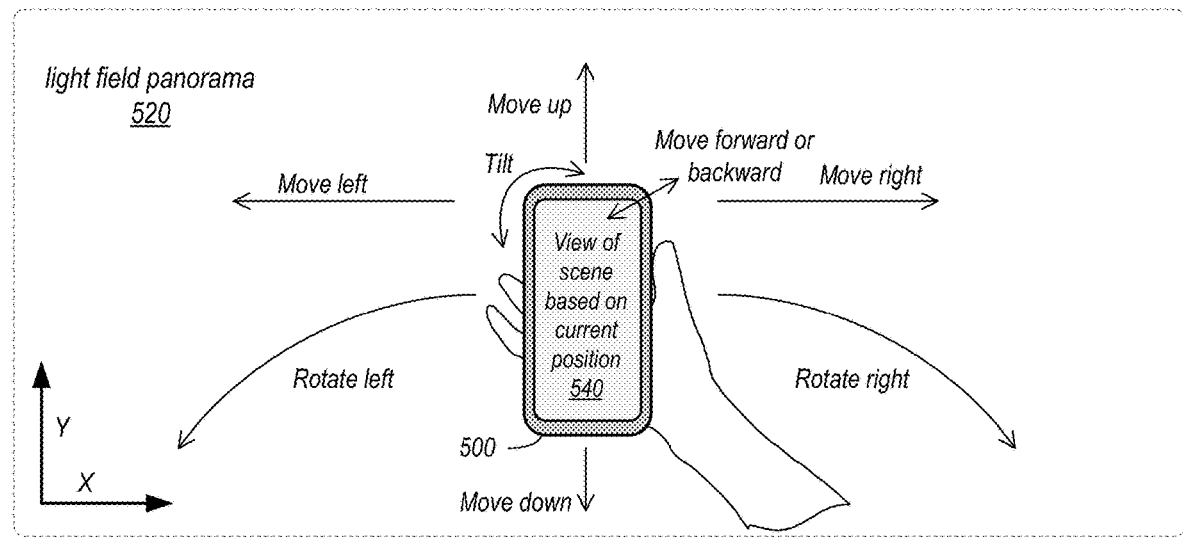
FIGS. 5A and 5B graphically illustrate viewing a light field panorama using a hand-held mobile device such as a smartphone or pad device, according to some embodiments.
Figure 5B:
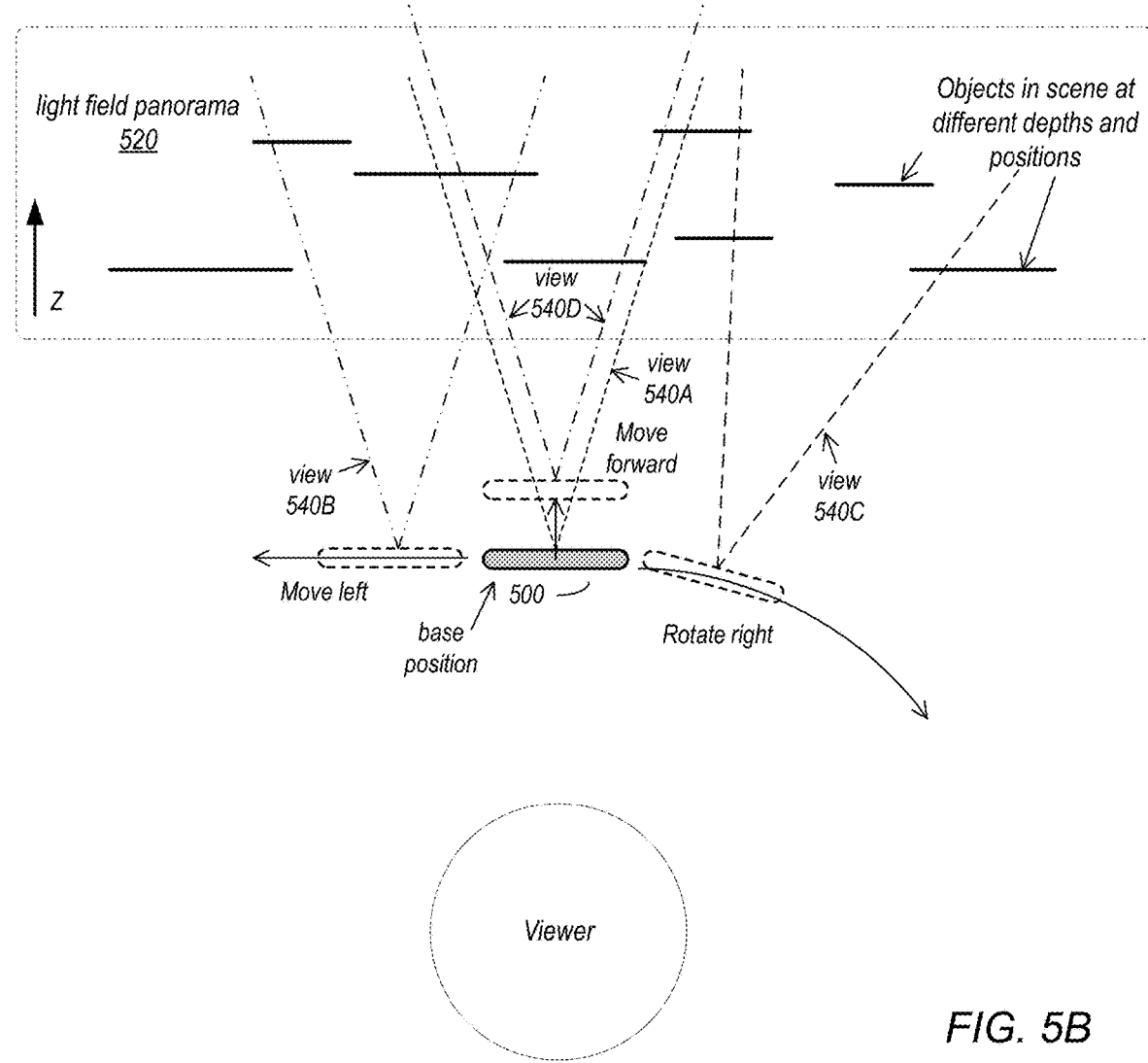

FIGS. 5A and 5B graphically illustrate viewing a light field panorama 520 using a mobile device 500 such as a smartphone or pad device, according to some embodiments. The image data in light field panorama 520 represents a scene as a volume with width (X), height (Y), and depth (Z). The light field panorama 520 allows a viewer to explore a scene with six degrees of freedom (6DOF), meaning the viewer can rotate with the content as well as translate in different directions. Using a rendering and viewing system of device 500, the viewer may thus change their viewing position and angle to see behind or over objects in the scene, zoom in or out on the scene, or view different parts of the scene.

FIG. 5A represents a "front" view of the light field panorama 520 that shows width and height of the scene captured in the panorama 520 data. FIG. 5B represents a "top" view of the light field panorama 520 that shows depth of the scene captured in the panorama 520 data. While FIGS. 5A and 5B show the volume as rectangular, note that the volume may be any arbitrary shape depending on coverage of the frames included in the panorama 520.

As shown in FIG. 5A, a viewer may move (translate) device 500 to the left, right, up, or down (or diagonally) to view different parts of the scene. The viewer may instead or also rotate the device 500 to the left or the right, or up or down (referred to as "tilt") to view the scene at different angles. The viewer may also move the device 500 forward and backward to zoom in or out on the scene. As the viewer moves the device 500, a rendering engine may obtain or estimate a current position of the device 500 in relation to the scene represented by light field panorama 520, and dynamically render and cause to be displayed a view 540 of the scene from the images and metadata in light field panorama 520 based on the current position.

FIG. 5B shows example portions of the scene that are viewed at different positions and rotations. In some embodiments, viewing a scene represented in a light field panorama 520 may start at a default or base position, as shown in FIG. 5B which displays a view of the scene represented by view 540A. The viewer may move or translate device 500 to the left to see a view of the scene represented by view 540B. The viewer may move or translate device 500 forward to zoom in on view 540A and thus see view 540D of the scene. The viewer may rotate device 500 to the right to see view 540C of the scene. As the viewer changes their viewing position and/or angle by translating or rotating the device 500, note that the user can see behind or over objects in the scene, zoom in or out on objects in the scene, or view objects in different parts of the scene.

Figure 6A:
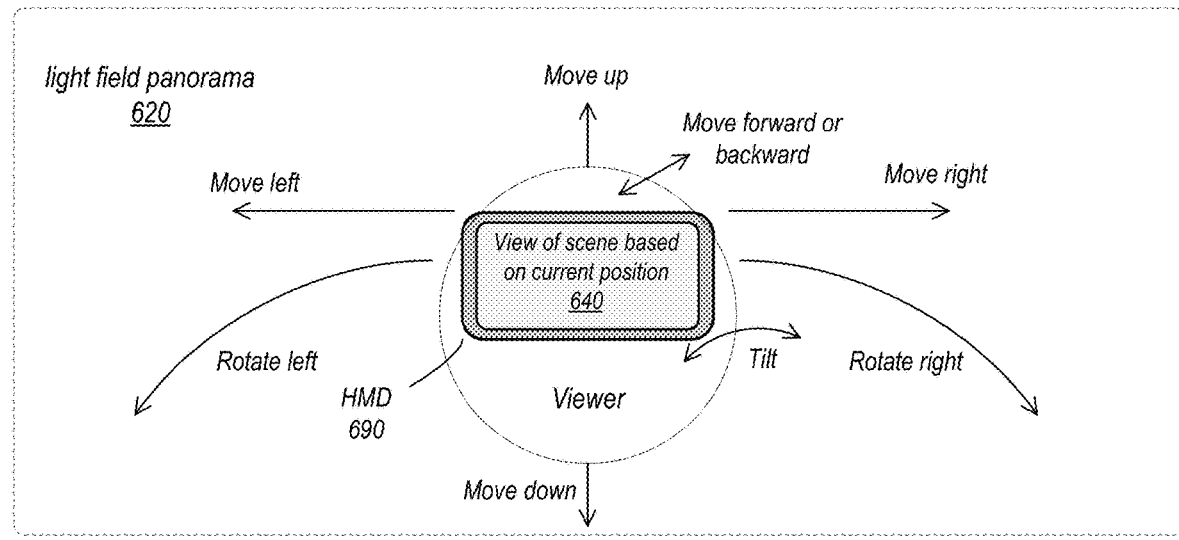
FIGS. 6A and 6B graphically illustrate viewing a light field panorama using a head-mounted display (HMD), according to some embodiments.
Figure 6B:
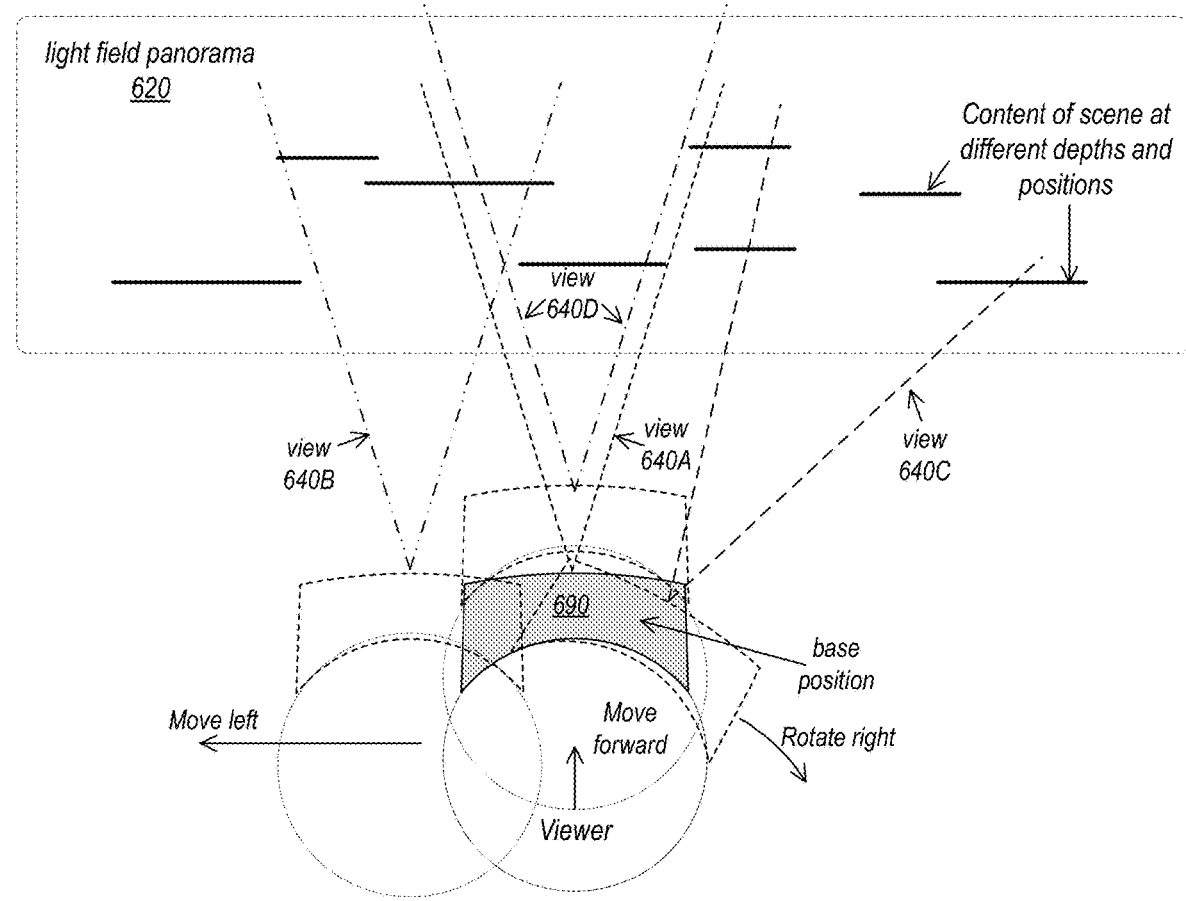

FIGS. 6A and 6B graphically illustrate viewing a light field panorama 620 using a head-mounted display (HMD) 690, according to some embodiments. The image data in light field panorama 620 represents a scene as a volume with width (X), height (Y), and depth (Z). The light field panorama 620 allows a viewer to explore a scene with six degrees of freedom (6DOF), meaning the viewer can rotate with the content as well as translate in different directions. Using a rendering and viewing system of HMD 690, the viewer may thus change their viewing position and angle to see behind or over objects in the scene, zoom in or out on the scene, or view different parts of the scene.

FIG. 6A represents a "front" view of the light field panorama 620 that shows width and height of the scene captured in the panorama 620 data. FIG. 6B represents a "top" view of the light field panorama 620 that shows depth of the scene captured in the panorama 620 data. While FIGS. 6A and 6B show the volume as rectangular, note that the volume may be any arbitrary shape depending on coverage of the frames included in the panorama 620.

As shown in FIG. 6A, a viewer may move (translate) their head to the left, right, up, or down (or diagonally) while wearing HMD 690 to view different parts of the scene. The viewer may instead or also rotate their head to the left or the right, or up or down (referred to as "tilt") to view the scene at different angles. The viewer may also move their head forward and backward to zoom in or out on the scene. As the viewer moves their head, a rendering engine may obtain or estimate a current position of the HMD 690 in relation to the scene represented by light field panorama 620, and dynamically render and cause to be displayed a view 640 of the scene from the images and metadata in light field panorama 620 based on the current position.

FIG. 6B shows example portions of the scene that are viewed at different positions and rotations. In some embodiments, viewing a scene represented in a light field panorama 620 may start at a default or base position, as shown in FIG. 6B which displays a view of the scene represented by view 640A. The viewer may move their head to the left to see a view of the scene represented by view 640B. The viewer may move their head forward to zoom in on view 640A and thus see view 640D of the scene. The viewer may rotate their head to the right to see view 640C of the scene. As the viewer changes their viewing position and/or angle by moving or rotating their head, note that the user can see behind or over objects in the scene, zoom in or out on objects in the scene, or view objects in different parts of the scene.

Real-Time and Post-Processing Architecture

Figure 7:
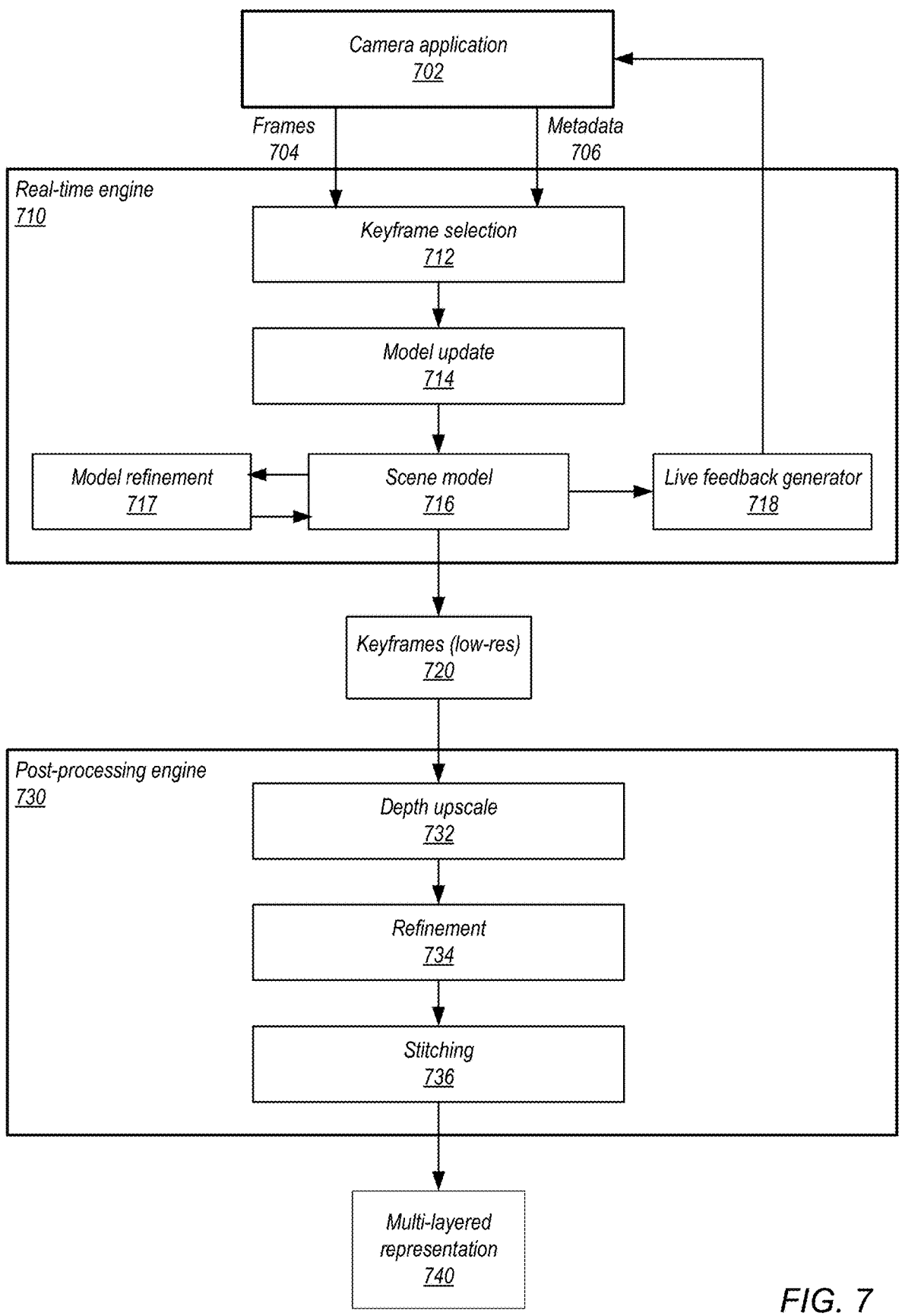
FIG. 7 illustrates a real-time and post-processing architecture for a light field panorama system, according to some embodiments.

FIG. 7 illustrates a real-time and post-processing architecture for a light field panorama system, according to some embodiments. In some embodiments, a real-time engine 720 executing on a mobile device used to capture the images and/or as a network-based service may generate and display a live preview of the captured scene to the user interface of the device. The real-time engine 720 may also perform other functions such as keyframe selection, and may output keyframes, depth information for the keyframes, and pose (e.g., position and orientation) information for the keyframes to a post-processing engine 730, for example executing as a network-based service or on one or more computer systems. The real-time 720 and post-processing 730 engines may be components or stages of a processing pipeline 210 as illustrated in FIG. 2.

A camera application 702 executing on the mobile device (e.g., a smartphone, pad, tablet, or camera) captures frames 704 and metadata 706 during a gesture performed by a user holding the device. The frames 704 include pixel data (e.g., in RGB format). Metadata 706 may include, but is not limited to, camera position and orientation information from motion and position sensing technology of the device. The frames 704 and metadata 706 are input to a keyframe selection 712 process of real-time engine 710. Keyframe selection 712 selects one or more keyframes from the input frames based on one or more criteria (e.g., scene features).

The real-time engine 710 may generate and update a model 716 of the scene being captured. Model 716 may be a low-resolution representation for preview of the scene being captured, and may be a volumetric or keyframe-based dense representation of the scene being captured. Keyframe selection 712 inputs selected keyframes to a model update 714 process. Model update 714 may determine depth information for each keyframe, and integrate the keyframe into model 716.

In some embodiments, a model refinement 717 process may execute, for example as a background thread. Model refinement may, for example, perform global bundle adjustment of the model 716, and may re-integrate earlier keyframes into the model.

A live feedback generator 718 may convert the low-resolution representation of the model 716 into visual feedback that is provided to the camera application 702 for presentation as a preview via the user interface.

Keyframes 720 from model 716 may be input to post-processing engine 730. The keyframes 720 are "low resolution", and each include high-resolution pixel data with low-resolution depth data, and pose (position and orientation) information for the keyframe as metadata. A depth upscale 732 process upscales the depth data for the keyframes 720 to high-resolution. A refinement 734 process performs global bundle adjustment of the keyframes 720 at high resolution. A stitching 736 process stitches the pixel and depth data of the keyframes 720 to generate a compact 3D light-field representation that includes a primary layer and one or more occlusion layers for the captured scene (multi-layered representation 740). Note that multi-layered representation 740 is an example representation for a light field panorama as described in reference to FIGS. 1 and 2.

Figure 8:
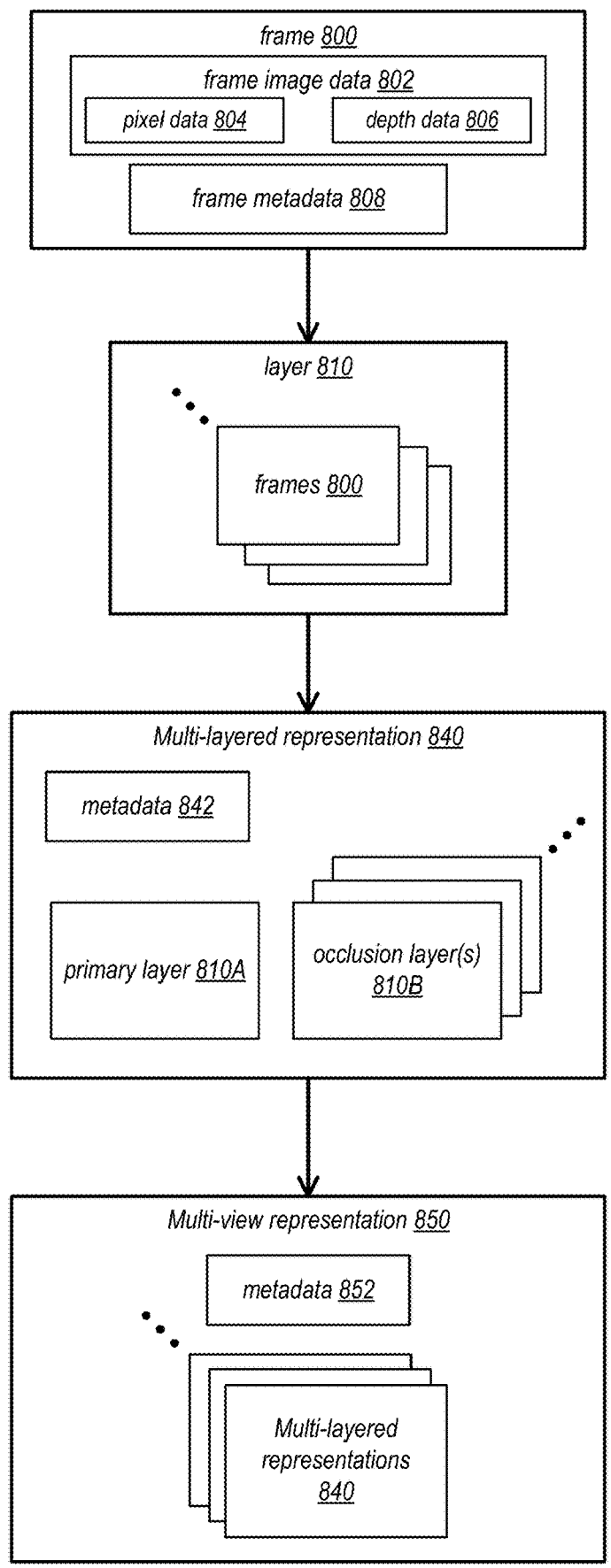
FIG. 8 illustrates a multi-layered representation of a light field panorama, according to some embodiments.

FIG. 8 illustrates a multi-layered representation 840 for light field panoramas, according to some embodiments. A multi-layered representation 840 may include a primary layer 810A, one or more occlusion layers 810B, and metadata 842. Each layer 810 may include one or more frames 800. Each frame 800 may include frame image data 802 consisting of high-resolution pixel data 804 and depth data 806, and frame metadata 808.

Primary layer 810A includes a color (e.g., RGB) image plus a depth image. The color image in the primary layer is a "hero shot" that may, for example, be exported as an image of the scene (e.g., a jpeg image). If there is no depth image in the primary layer 810A, the multi-layered representation 840 degrades to a standard 2D image.

There may be one or more occlusion layers 810B. Each occlusion layer includes a color image plus a sparse depth image of points not seen (occluded) in previous layers.

The color and depth images in each layer 810 are either aligned or have an extrinsic transformation stored in metadata 808. In some embodiments, an intrinsic matrix is stored in metadata 808 for each depth image. In some embodiments, metadata 808 includes a gravity vector and a real-world scale to enhance virtual reality (VR) viewing.

In some embodiments, the layers 810 may contain color and depth video data instead of single frames.

As shown in FIG. 8, in some embodiments one or more multi-layered representations 840 of a scene may be captured and processed and combined to form a multi-view representation 850 of the scene. A user may perform multiple gestures to capture multiple multi-layered representations 840 of a scene from different viewpoints, and the multiple multi-layered representations 840 may be stored as a multi-view representation 850 of the scene with appropriate metadata 852. A multi-view representation 850 of a scene may support effects based on viewing angle such as specularity.

Example Computing Device

Figure 9:
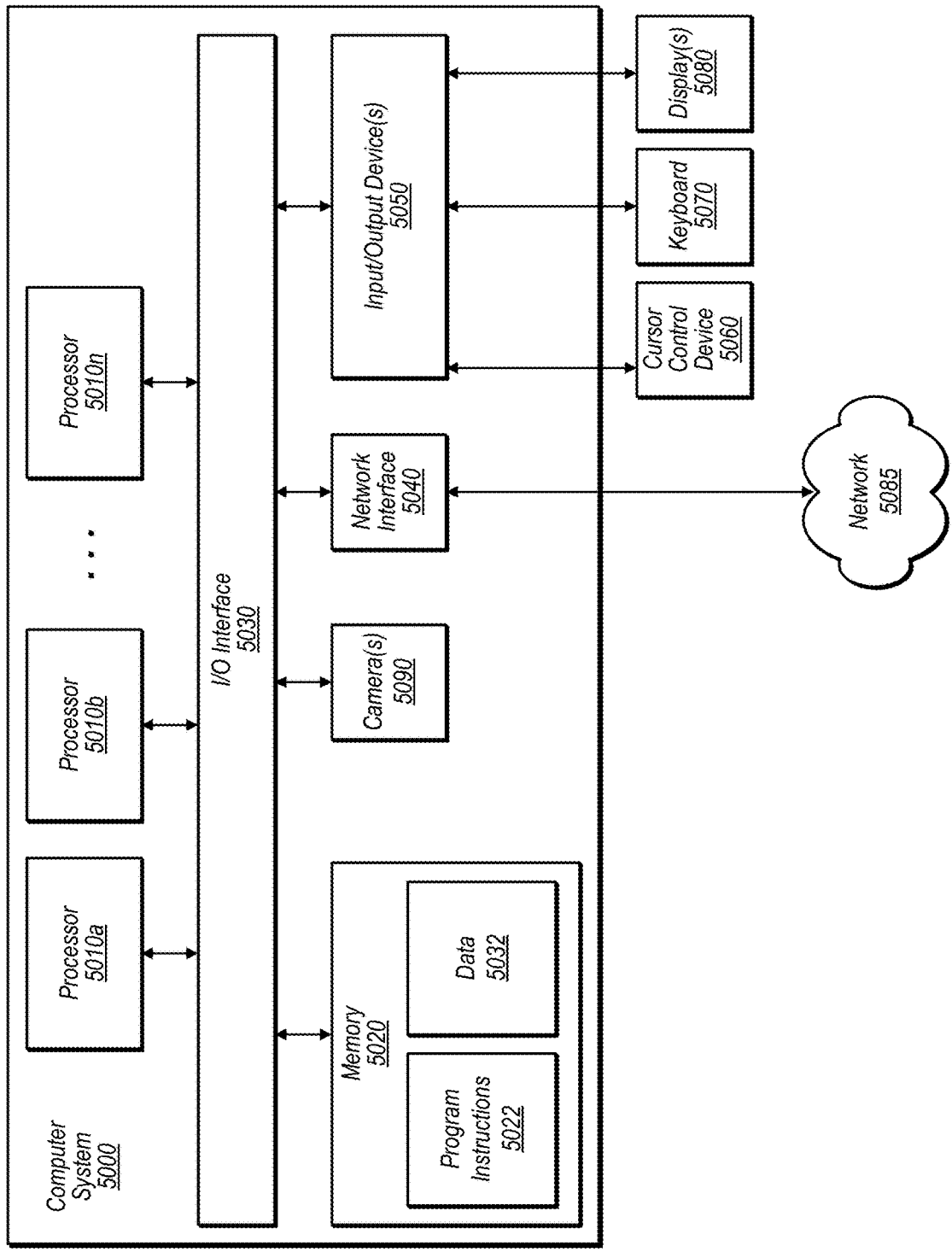
FIG. 9 illustrates an example computing device that may be used in embodiments of a light field panorama system as illustrated in FIGS. 1 through 8.

FIG. 9 illustrates an example computing device, referred to as computer system 5000, that may be used in embodiments of a light field panorama system as illustrated in FIGS. 1 through 8. In addition, computer system 5000 may implement methods for controlling operations of the camera and/or for performing image processing of images captured with the camera. In different embodiments, computer system 5000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, or in general any type of computing or electronic device.

In the illustrated embodiment, computer system 5000 includes one or more processors 5010 coupled to a system memory 5020 via an input/output (I/O) interface 5030. Computer system 5000 further includes a network interface 5040 coupled to I/O interface 5030, and one or more input/output devices 5050, such as cursor control device 5060, keyboard 5070, and display(s) 5080. Computer system 5000 may also include one or more cameras 5090, for example at least one camera that may be used to capture frames in embodiments of a light field panorama system as described herein.

In various embodiments, computer system 5000 may be a uniprocessor system including one processor 5010, or a multiprocessor system including several processors 5010 (e.g., two, four, eight, or another suitable number). Processors 5010 may be any suitable processor capable of executing instructions. For example, in various embodiments processors 5010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 5010 may commonly, but not necessarily, implement the same ISA.

System memory 5020 may be configured to store program instructions 5022 and/or data 5032 accessible by processor 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions 5022 may be configured to implement various interfaces, methods and/or data for controlling operations of camera 5090 and for capturing and processing images with integrated camera 5090 or other methods or data, for example interfaces and methods for capturing, displaying, processing, and storing images captured with camera 5090. In some embodiments, program instructions and/or data may be received, sent or stored upon different types of computer-accessible media or on similar media separate from system memory 5020 or computer system 5000.

In one embodiment, I/O interface 5030 may be configured to coordinate I/O traffic between processor 5010, system memory 5020, and any peripheral devices in the device, including network interface 5040 or other peripheral interfaces, such as input/output devices 5050. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices attached to a network 5085 (e.g., carrier or agent devices) or between nodes of computer system 5000. Network 5085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 5040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 5050 may, in some embodiments, include one or more display terminals, keyboards, keypads, touchpads, scanning devices, voice or optical recognition devices, or any other devices suitable for entering or accessing data by computer system 5000. Multiple input/output devices 5050 may be present in computer system 5000 or may be distributed on various nodes of computer system 5000. In some embodiments, similar input/output devices may be separate from computer system 5000 and may interact with one or more nodes of computer system 5000 through a wired or wireless connection, such as over network interface 5040.

As shown in FIG. 9, memory 5020 may include program instructions 5022, which may be processor-executable to implement any element or action to support integrated camera 5090, including but not limited to image processing software and interface software for controlling camera 5090. In some embodiments, images captured by camera 5090 may be stored to memory 5020. In addition, metadata for images captured by camera 5090 may be stored to memory 5020.

Those skilled in the art will appreciate that computer system 5000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, image signal processing (ISP) modules, system on a chip (SoC) modules, head-mounted display (HMD) see-through camera embedded camera pipelines, etc. Computer system 5000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 5000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 5000 may be transmitted to computer system 5000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, SSD storage, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a mobile device comprising a camera, wherein the mobile device is configured to capture a plurality of images of a scene from different positions during a gesture made with the mobile device;
   one or more processors that implement a processing pipeline configured to:
      determine relative camera positions of the images with respect to the scene;
      compute depth information for the images based at least in part on the determined relative camera positions of the images; and
      generate a three-dimensional light field panorama of the scene based on the images and the depth information.

2. The system as recited in claim 1, wherein, to determine camera positions of the images, the processing pipeline is configured to:
   identify feature points in the images;
   correlate the feature points across the images; and
   compute the camera positions of the images based at least in part on relative disparity between the feature points in different images.

3. The system as recited in claim 1, wherein the mobile device is configured to capture motion and position data for the images captured during the gesture, and wherein the processing pipeline is configured to compute the camera positions for the images based at least in part on the motion and position data captured for the images.

4. The system as recited in claim 1, wherein, to compute depth information for the images based at least in part on the camera position of the images, the processing pipeline is configured to:
   determine pixel disparity between the images;
   determine distance between the images; and
   determine the depth information for each image based at least in part on the pixel disparity and the distance between the images.

5. The system as recited in claim 1, further comprising:
   a viewing device comprising at least one display screen; and
   one or more processors that implement a rendering engine configured to iteratively perform:
      determine a current perspective of the device with respect to the scene captured in the light field panorama based at least in part on a current position of the viewing device; and
      render a view of the scene captured in the light field panorama from the current perspective for display on the at least one display screen of the viewing device.

6. The system as recited in claim 5, wherein the viewing device is one of a mobile device, a head-mounted display, a television, a computer monitor, or a display wall.

7. The system as recited in claim 1, wherein the mobile device is one of a smartphone, a tablet device, or a pad device.

8. The system as recited in claim 1, wherein the light-field panorama comprises:
   a primary layer; and
   one or more occlusion layers;
   wherein each layer includes one or more images, wherein each image comprises:
      pixel data for the image and depth data for the image; and
      metadata including position information for the image with respect to the scene and other ones of the images.

9. The system as recited in claim 1, wherein the processing pipeline is implemented on the mobile device.

10. The system as recited in claim 1, wherein the processing pipeline is implemented on one or more devices of a network-based service.

11. The system as recited in claim 1, wherein the processing pipeline is distributed between the mobile device and a network-based service.

12. A method, comprising:
   capturing, by a camera of a mobile device during a gesture made with the mobile device, a plurality of images of a scene from different positions;
   performing, by a processing pipeline implemented by one or more processors:
      determining relative camera positions of the images with respect to the scene;
      computing depth information for the images based at least in part on the determined relative camera positions of the images; and
      generating a three-dimensional light field panorama of the scene based on the images and the depth information.

13. The method as recited in claim 12, wherein determining camera positions of the images comprises:
   identifying feature points in the images;
   correlating the feature points across the images; and computing the camera positions for the images based at least in part on relative disparity between the feature points in different images.

14. The method as recited in claim 12, further comprising:
capturing motion and position data for the images captured during the gesture; and
computing the camera positions for the images based at least in part on the motion and position data captured for the images.

15. The method as recited in claim 12, wherein computing depth information for the images based at least in part on the position of the images comprises:
determining pixel disparity between the images;
determining distance between the images; and
determining the depth information for each image based at least in part on the pixel disparity and the distance between the images.

16. The method as recited in claim 12, further comprising performing, by a rendering engine implemented by one or more processors:
determining current perspectives of a viewer with respect to the scene captured in the light field panorama based at least in part on current positions of a viewing device as the viewing device is translated or rotated by the viewer; and
rendering views of the scene captured in the light field panorama from the current perspective for display on at least one display screen of the viewing device.

17. The method as recited in claim 16, wherein the viewing device is one of a mobile device, a head-mounted display, a television, a computer monitor, or a display wall.

18. The method as recited in claim 12, wherein the mobile device is one of a smartphone, a tablet device, or a pad device.

19. The method as recited in claim 12, wherein the light-field panorama comprises:
a primary layer; and
one or more occlusion layers;
wherein each layer includes one or more images, wherein each image comprises:
pixel data for the image and depth data for the image; and
metadata including position information for the image with respect to the scene and other ones of the images.

20. A system, comprising:
a mobile device comprising a camera and one or more processors that implement a camera application configured to:
capture a plurality of images of a scene from different positions during a gesture made with the mobile device;
capture camera position and orientation data for the images from motion and position sensors of the mobile device;
one or more processors that implement a real-time engine configured to, during capture of the images:
determine low-resolution depth data for the images;
integrate the images into a model of the scene, wherein the model is a low-resolution representation of the scene being captured, wherein each image in the model includes high-resolution pixel data, the determined low-resolution depth data, and the camera position and orientation data for the image;
convert the low-resolution representation of the scene into visual feedback; and
provide the visual feedback to the camera application for presentation as a preview via a user interface on the mobile device.

21. The system as recited in claim 20, further comprising one or more processors that implement a post-processing engine configured to, after capture of the images:
receive the images from the model;
upscale the depth data for the images to high-resolution;
perform global bundle adjustment of the images at high resolution; and
stitch the pixel data and the depth data of the images to generate a light-field representation of the captured scene that includes a primary and one or more occlusion layers for the captured scene.

22. The system as recited in claim 21, wherein each layer includes one or more images, wherein each image comprises:
pixel data for the image and depth data for the image; and
metadata including position information for the image with respect to the scene and other ones of the images.

23. The system as recited in claim 21, wherein the post-processing engine is implemented on the mobile device.

24. The system as recited in claim 21, wherein the post-processing engine is implemented on one or more devices of a network-based service.

25. The system as recited in claim 21, wherein the post-processing engine is distributed between the mobile device and a network-based service.

* * * * *